(12) United States Patent
O'Neill

(10) Patent No.: US 7,127,080 B2
(45) Date of Patent: Oct. 24, 2006

(54) METHOD OF PROCESSING IMAGE DATA TO REORIENT AN IMAGE REPRESENTED BY THE IMAGE DATA IN AN IMAGE-BASED ITEM PROCESSING SYSTEM AND AN APPARATUS THEREFOR

(75) Inventor: Darryl S. O'Neill, Waterloo (CA)

(73) Assignee: NCR Corporation, Dayton, OH (US)

( * ) Notice: Subject to any disclaimer, the term of this patent is extended or adjusted under 35 U.S.C. 154(b) by 681 days.

(21) Appl. No.: 10/261,139

(22) Filed: Sep. 30, 2002

(65) Prior Publication Data

US 2004/0062431 A1    Apr. 1, 2004

(51) Int. Cl.
*G06K 9/00* (2006.01)
(52) U.S. Cl. ........................ 382/100; 382/296; 382/297
(58) Field of Classification Search ................ 380/100; 382/137, 216, 289, 296, 297, 100; 345/158, 345/164, 184, 649, 659, 689; 348/137, 146, 348/583
See application file for complete search history.

(56) References Cited

U.S. PATENT DOCUMENTS

| | | | | |
|---|---|---|---|---|
| 4,627,097 A | * | 12/1986 | Finlay et al. | ................ 382/297 |
| 4,703,515 A | * | 10/1987 | Baroody, Jr. | ................ 382/297 |
| 5,235,651 A | * | 8/1993 | Nafarieh | ..................... 382/290 |
| 5,479,525 A | * | 12/1995 | Nakamura et al. | .......... 382/297 |
| 6,275,622 B1 | * | 8/2001 | Krtolica | ...................... 382/296 |
| 6,643,415 B1 | * | 11/2003 | Fukai et al. | ................ 382/296 |
| 6,826,314 B1 | * | 11/2004 | Eguchi | ........................ 382/298 |
| 6,980,701 B1 | * | 12/2005 | Itoh | ............................ 382/296 |

* cited by examiner

*Primary Examiner*—Jingge Wu
*Assistant Examiner*—Abolfazi Tabatabai
(74) *Attorney, Agent, or Firm*—Michael Chan

(57) ABSTRACT

A method of processing image data elements derived from lifting an image of an item to reorient the image data elements comprises the steps of (a) selecting a first portion of the image data elements, (b) reorienting the first portion of the image data elements selected in step (a), (c) selecting a second portion of image data elements after the first portion of the image data elements has been reoriented in step (b), and (d) reorienting the second portion of the image data elements selected in step (c). Preferably, each of the selected first and second portions of image data elements is copied only once into level one cache memory.

6 Claims, 16 Drawing Sheets

FIG. 6

|  | GROUP II | GROUP IV |
|---|---|---|
| | 08 16 24 32 | 08 16 24 32 |
| | 07 15 23 31 | 07 15 23 31 |
| | 06 14 22 30 | 06 14 22 30 |
| | 05 13 21 29 | 05 13 21 29 |
| | 04 12 20 28 | 04 12 20 28 |
| | 03 11 19 27 | 03 11 19 27 |
| | 02 10 18 26 | 02 10 18 26 |
| | 01 09 17 25 | 01 09 17 25 |
| 302 | 08 16 24 32 | 08 16 24 32 |
| | 07 15 23 31 | 07 15 23 31 |
| | 06 14 22 30 | 06 14 22 30 |
| | 05 13 21 29 | 05 13 21 29 |
| | 04 12 20 28 | 04 12 20 28 |
| | 03 11 19 27 | 03 11 19 27 |
| 301 | 02 10 18 26 | 02 10 18 26 |
| | 01 09 17 25 | 01 09 17 25 |
|  | GROUP I | GROUP III |

FIG. 7A
LEVEL 1 CACHE

| | | | | |
|---|---|---|---|---|
| CACHE LINE 1 | (01) | 09 | 17 | 25 |
| CACHE LINE 2 | X | X | X | X |
| CACHE LINE 3 | X | X | X | X |
| CACHE LINE 4 | X | X | X | X |
| CACHE LINE 5 | X | X | X | X |
| CACHE LINE 6 | X | X | X | X |

FIG. 7B
LEVEL 1 CACHE

| | | | | |
|---|---|---|---|---|
| CACHE LINE 1 | 01 | 09 | 17 | 25 |
| CACHE LINE 2 | (01) | X | X | X |
| CACHE LINE 3 | X | X | X | X |
| CACHE LINE 4 | X | X | X | X |
| CACHE LINE 5 | X | X | X | X |
| CACHE LINE 6 | X | X | X | X |

FIG. 7C
LEVEL 1 CACHE

| | | | | |
|---|---|---|---|---|
| CACHE LINE 1 | 01 | 09 | 17 | 25 |
| CACHE LINE 2 | 01 | X | X | X |
| CACHE LINE 3 | (02) | 10 | 18 | 26 |
| CACHE LINE 4 | X | X | X | X |
| CACHE LINE 5 | X | X | X | X |
| CACHE LINE 6 | X | X | X | X |

FIG. 7D
LEVEL 1 CACHE

| | | | | |
|---|---|---|---|---|
| CACHE LINE 1 | 01 | 09 | 17 | 25 |
| CACHE LINE 2 | 01 | (02) | X | X |
| CACHE LINE 3 | 02 | 10 | 18 | 26 |
| CACHE LINE 4 | X | X | X | X |
| CACHE LINE 5 | X | X | X | X |
| CACHE LINE 6 | X | X | X | X |

FIG. 7E
LEVEL 1 CACHE

| | | | | |
|---|---|---|---|---|
| CACHE LINE 1 | 01 | 09 | 17 | 25 |
| CACHE LINE 2 | 01 | 02 | X | X |
| CACHE LINE 3 | 02 | 10 | 18 | 26 |
| CACHE LINE 4 | (03) | 11 | 19 | 27 |
| CACHE LINE 5 | X | X | X | X |
| CACHE LINE 6 | X | X | X | X |

FIG. 7F
LEVEL 1 CACHE

| | | | | |
|---|---|---|---|---|
| CACHE LINE 1 | 01 | 09 | 17 | 25 |
| CACHE LINE 2 | 01 | 02 | (03) | X |
| CACHE LINE 3 | 02 | 10 | 18 | 26 |
| CACHE LINE 4 | 03 | 11 | 19 | 27 |
| CACHE LINE 5 | X | X | X | X |
| CACHE LINE 6 | X | X | X | X |

FIG. 7G
LEVEL 1 CACHE

| | | | | |
|---|---|---|---|---|
| CACHE LINE 1 | 01 | 09 | 17 | 25 |
| CACHE LINE 2 | 01 | 02 | 03 | X |
| CACHE LINE 3 | 02 | 10 | 18 | 26 |
| CACHE LINE 4 | 03 | 11 | 19 | 27 |
| CACHE LINE 5 | (04) | 12 | 20 | 28 |
| CACHE LINE 6 | X | X | X | X |

FIG. 7H
LEVEL 1 CACHE

| | | | | |
|---|---|---|---|---|
| CACHE LINE 1 | 01 | 09 | 17 | 25 |
| CACHE LINE 2 | 01 | 02 | 03 | (04) |
| CACHE LINE 3 | 02 | 10 | 18 | 26 |
| CACHE LINE 4 | 03 | 11 | 19 | 27 |
| CACHE LINE 5 | 04 | 12 | 20 | 28 |
| CACHE LINE 6 | X | X | X | X |

FIG. 7I

LEVEL 1 CACHE

| | | | | |
|---|---|---|---|---|
| CACHE LINE 1 | 01 | (09) | 17 | 25 |
| CACHE LINE 2 | 01 | 02 | 03 | 04 |
| CACHE LINE 3 | 02 | 10 | 18 | 26 |
| CACHE LINE 4 | 03 | 11 | 19 | 27 |
| CACHE LINE 5 | 04 | 12 | 20 | 28 |
| CACHE LINE 6 | X | X | X | X |

FIG. 7J

LEVEL 1 CACHE

| | | | | |
|---|---|---|---|---|
| CACHE LINE 1 | 01 | 09 | 17 | 25 |
| CACHE LINE 2 | 01 | 02 | 03 | 04 |
| CACHE LINE 3 | 02 | 10 | 18 | 26 |
| CACHE LINE 4 | 03 | 11 | 19 | 27 |
| CACHE LINE 5 | 04 | 12 | 20 | 28 |
| CACHE LINE 6 | (09) | X | X | X |

FIG. 7K

LEVEL 1 CACHE

| | | | | |
|---|---|---|---|---|
| CACHE LINE 1 | 01 | 09 | 17 | 25 |
| CACHE LINE 2 | 01 | 02 | 03 | 04 |
| CACHE LINE 3 | 02 | (10) | 18 | 26 |
| CACHE LINE 4 | 03 | 11 | 19 | 27 |
| CACHE LINE 5 | 04 | 12 | 20 | 28 |
| CACHE LINE 6 | 09 | X | X | X |

FIG. 7L

LEVEL 1 CACHE

| | | | | |
|---|---|---|---|---|
| CACHE LINE 1 | 01 | 09 | 17 | 25 |
| CACHE LINE 2 | 01 | 02 | 03 | 04 |
| CACHE LINE 3 | 02 | 10 | 18 | 26 |
| CACHE LINE 4 | 03 | 11 | 19 | 27 |
| CACHE LINE 5 | 04 | 12 | 20 | 28 |
| CACHE LINE 6 | 09 | (10) | X | X |

FIG. 7M

LEVEL 1 CACHE

| | | | | |
|---|---|---|---|---|
| CACHE LINE 1 | 01 | 09 | 17 | 25 |
| CACHE LINE 2 | 01 | 02 | 03 | 04 |
| CACHE LINE 3 | 02 | 10 | 18 | 26 |
| CACHE LINE 4 | 03 | (11) | 19 | 27 |
| CACHE LINE 5 | 04 | 12 | 20 | 28 |
| CACHE LINE 6 | 09 | 10 | X | X |

FIG. 7N

LEVEL 1 CACHE

| | | | | |
|---|---|---|---|---|
| CACHE LINE 1 | 01 | 09 | 17 | 25 |
| CACHE LINE 2 | 01 | 02 | 03 | 04 |
| CACHE LINE 3 | 02 | 10 | 18 | 26 |
| CACHE LINE 4 | 03 | 11 | 19 | 27 |
| CACHE LINE 5 | 04 | 12 | 20 | 28 |
| CACHE LINE 6 | 09 | 10 | (11) | X |

FIG. 7O

LEVEL 1 CACHE

| | | | | |
|---|---|---|---|---|
| CACHE LINE 1 | 01 | 09 | 17 | 25 |
| CACHE LINE 2 | 01 | 02 | 03 | 04 |
| CACHE LINE 3 | 02 | 10 | 18 | 26 |
| CACHE LINE 4 | 03 | 11 | 19 | 27 |
| CACHE LINE 5 | 04 | (12) | 20 | 28 |
| CACHE LINE 6 | 09 | 10 | 11 | X |

FIG. 7P

LEVEL 1 CACHE

| | | | | |
|---|---|---|---|---|
| CACHE LINE 1 | 01 | 09 | 17 | 25 |
| CACHE LINE 2 | 01 | 02 | 03 | 04 |
| CACHE LINE 3 | 02 | 10 | 18 | 26 |
| CACHE LINE 4 | 03 | 11 | 19 | 27 |
| CACHE LINE 5 | 04 | 12 | 20 | 28 |
| CACHE LINE 6 | 09 | 10 | 11 | (12) |

FIG. 7Q

LEVEL 1 CACHE

|  | | | | |
|---|---|---|---|---|
| CACHE LINE 1 | 01 | 09 | (17) | 25 |
| CACHE LINE 2 | 01 | 02 | 03 | 04 |
| CACHE LINE 3 | 02 | 10 | 18 | 26 |
| CACHE LINE 4 | 03 | 11 | 19 | 27 |
| CACHE LINE 5 | 04 | 12 | 20 | 28 |
| CACHE LINE 6 | 09 | 10 | 11 | 12 |

FIG. 7R

LEVEL 1 CACHE

|  | | | | |
|---|---|---|---|---|
| CACHE LINE 1 | 01 | 09 | 17 | 25 |
| CACHE LINE 2 | (17) | X | X | X |
| CACHE LINE 3 | 02 | 10 | 18 | 26 |
| CACHE LINE 4 | 03 | 11 | 19 | 27 |
| CACHE LINE 5 | 04 | 12 | 20 | 28 |
| CACHE LINE 6 | 09 | 10 | 11 | 12 |

FIG. 8

LEVEL 2 CACHE

|  | | | | | | |
|---|---|---|---|---|---|---|
| CACHE LINE 1 | 01 | 02 | 03 | 04 | X | X |
| CACHE LINE 2 | X | X | X | X | X | X |
| CACHE LINE 3 | X | X | X | X | X | X |
| CACHE LINE 4 | X | X | X | X | X | X |
| CACHE LINE 5 | X | X | X | X | X | X |
| CACHE LINE 6 | X | X | X | X | X | X |
| CACHE LINE 7 | X | X | X | X | X | X |
| CACHE LINE 8 | X | X | X | X | X | X |

FIG. 9A

LEVEL 1 CACHE

| | | | | |
|---|---|---|---|---|
| CACHE LINE 1 | 01 | 09 | 17 | 25 |
| CACHE LINE 2 | 17 | X | X | X |
| CACHE LINE 3 | 02 | 10 | (18) | 26 |
| CACHE LINE 4 | 03 | 11 | 19 | 27 |
| CACHE LINE 5 | 04 | 12 | 20 | 28 |
| CACHE LINE 6 | 09 | 10 | 11 | 12 |

FIG. 9B

LEVEL 1 CACHE

| | | | | |
|---|---|---|---|---|
| CACHE LINE 1 | 01 | 09 | 17 | 25 |
| CACHE LINE 2 | 17 | (18) | X | X |
| CACHE LINE 3 | 02 | 10 | 18 | 26 |
| CACHE LINE 4 | 03 | 11 | 19 | 27 |
| CACHE LINE 5 | 04 | 12 | 20 | 28 |
| CACHE LINE 6 | 09 | 10 | 11 | 12 |

FIG. 9C

LEVEL 1 CACHE

| | | | | |
|---|---|---|---|---|
| CACHE LINE 1 | 01 | 09 | 17 | 25 |
| CACHE LINE 2 | 17 | 18 | X | X |
| CACHE LINE 3 | 02 | 10 | 18 | 26 |
| CACHE LINE 4 | 03 | 11 | (19) | 27 |
| CACHE LINE 5 | 04 | 12 | 20 | 28 |
| CACHE LINE 6 | 09 | 10 | 11 | 12 |

FIG. 9D

LEVEL 1 CACHE

| | | | | |
|---|---|---|---|---|
| CACHE LINE 1 | 01 | 09 | 17 | 25 |
| CACHE LINE 2 | 17 | 18 | (19) | X |
| CACHE LINE 3 | 02 | 10 | 18 | 26 |
| CACHE LINE 4 | 03 | 11 | 19 | 27 |
| CACHE LINE 5 | 04 | 12 | 20 | 28 |
| CACHE LINE 6 | 09 | 10 | 11 | 12 |

FIG. 9E

LEVEL 1 CACHE

| | | | | |
|---|---|---|---|---|
| CACHE LINE 1 | 01 | 09 | 17 | 25 |
| CACHE LINE 2 | 17 | 18 | 19 | X |
| CACHE LINE 3 | 02 | 10 | 18 | 26 |
| CACHE LINE 4 | 03 | 11 | 19 | 27 |
| CACHE LINE 5 | 04 | 12 | (20) | 28 |
| CACHE LINE 6 | 09 | 10 | 11 | 12 |

FIG. 9F

LEVEL 1 CACHE

| | | | | |
|---|---|---|---|---|
| CACHE LINE 1 | 01 | 09 | 17 | 25 |
| CACHE LINE 2 | 17 | 18 | 19 | (20) |
| CACHE LINE 3 | 02 | 10 | 18 | 26 |
| CACHE LINE 4 | 03 | 11 | 19 | 27 |
| CACHE LINE 5 | 04 | 12 | 20 | 28 |
| CACHE LINE 6 | 09 | 10 | 11 | 12 |

FIG. 9G

LEVEL 1 CACHE

| | | | | |
|---|---|---|---|---|
| CACHE LINE 1 | 01 | 09 | 17 | (25) |
| CACHE LINE 2 | 17 | 18 | 19 | 20 |
| CACHE LINE 3 | 02 | 10 | 18 | 26 |
| CACHE LINE 4 | 03 | 11 | 19 | 27 |
| CACHE LINE 5 | 04 | 12 | 20 | 28 |
| CACHE LINE 6 | 09 | 10 | 11 | 12 |

FIG. 9H

LEVEL 1 CACHE

| | | | | |
|---|---|---|---|---|
| CACHE LINE 1 | 01 | 09 | 17 | 25 |
| CACHE LINE 2 | 17 | 18 | 19 | 20 |
| CACHE LINE 3 | 02 | 10 | 18 | 26 |
| CACHE LINE 4 | 03 | 11 | 19 | 27 |
| CACHE LINE 5 | 04 | 12 | 20 | 28 |
| CACHE LINE 6 | (25) | X | X | X |

FIG.10

LEVEL 2 CACHE

| | | | | | | |
|---|---|---|---|---|---|---|
| CACHE LINE 1 | 01 | 02 | 03 | 04 | X | X |
| CACHE LINE 2 | 09 | 10 | 11 | 12 | X | X |
| CACHE LINE 3 | X | X | X | X | X | X |
| CACHE LINE 4 | X | X | X | X | X | X |
| CACHE LINE 5 | X | X | X | X | X | X |
| CACHE LINE 6 | X | X | X | X | X | X |
| CACHE LINE 7 | X | X | X | X | X | X |
| CACHE LINE 8 | X | X | X | X | X | X |

FIG. 11A
LEVEL 1 CACHE
| | | | | |
|---|---|---|---|---|
| CACHE LINE 1 | 01 | 09 | 17 | 25 |
| CACHE LINE 2 | 17 | 18 | 19 | 20 |
| CACHE LINE 3 | 02 | 10 | 18 | (26) |
| CACHE LINE 4 | 03 | 11 | 19 | 27 |
| CACHE LINE 5 | 04 | 12 | 20 | 28 |
| CACHE LINE 6 | 25 | X | X | X |

FIG. 11B
LEVEL 1 CACHE
| | | | | |
|---|---|---|---|---|
| CACHE LINE 1 | 01 | 09 | 17 | 25 |
| CACHE LINE 2 | 17 | 18 | 19 | 20 |
| CACHE LINE 3 | 02 | 10 | 18 | 26 |
| CACHE LINE 4 | 03 | 11 | 19 | 27 |
| CACHE LINE 5 | 04 | 12 | 20 | 28 |
| CACHE LINE 6 | 25 | (26) | X | X |

FIG. 11C
LEVEL 1 CACHE
| | | | | |
|---|---|---|---|---|
| CACHE LINE 1 | 01 | 09 | 17 | 25 |
| CACHE LINE 2 | 17 | 18 | 19 | 20 |
| CACHE LINE 3 | 02 | 10 | 18 | 26 |
| CACHE LINE 4 | 03 | 11 | 19 | (27) |
| CACHE LINE 5 | 04 | 12 | 20 | 28 |
| CACHE LINE 6 | 25 | 26 | X | X |

FIG. 11D
LEVEL 1 CACHE
| | | | | |
|---|---|---|---|---|
| CACHE LINE 1 | 01 | 09 | 17 | 25 |
| CACHE LINE 2 | 17 | 18 | 19 | 20 |
| CACHE LINE 3 | 02 | 10 | 18 | 26 |
| CACHE LINE 4 | 03 | 11 | 19 | 27 |
| CACHE LINE 5 | 04 | 12 | 20 | 28 |
| CACHE LINE 6 | 25 | 26 | (27) | X |

FIG. 11E
LEVEL 1 CACHE
| | | | | |
|---|---|---|---|---|
| CACHE LINE 1 | 01 | 09 | 17 | 25 |
| CACHE LINE 2 | 17 | 18 | 19 | 20 |
| CACHE LINE 3 | 02 | 10 | 18 | 26 |
| CACHE LINE 4 | 03 | 11 | 19 | 27 |
| CACHE LINE 5 | 04 | 12 | 20 | (28) |
| CACHE LINE 6 | 25 | 26 | 27 | X |

FIG. 11F
LEVEL 1 CACHE
| | | | | |
|---|---|---|---|---|
| CACHE LINE 1 | 01 | 09 | 17 | 25 |
| CACHE LINE 2 | 17 | 18 | 19 | 20 |
| CACHE LINE 3 | 02 | 10 | 18 | 26 |
| CACHE LINE 4 | 03 | 11 | 19 | 27 |
| CACHE LINE 5 | 04 | 12 | 20 | 28 |
| CACHE LINE 6 | 25 | 26 | 27 | (28) |

FIG. 11G
LEVEL 1 CACHE
| | | | | |
|---|---|---|---|---|
| CACHE LINE 1 | (05) | 13 | 21 | 29 |
| CACHE LINE 2 | 17 | 18 | 19 | 20 |
| CACHE LINE 3 | 02 | 10 | 18 | 26 |
| CACHE LINE 4 | 03 | 11 | 19 | 27 |
| CACHE LINE 5 | 04 | 12 | 20 | 28 |
| CACHE LINE 6 | 25 | 26 | 27 | 28 |

FIG. 11H
LEVEL 1 CACHE
| | | | | |
|---|---|---|---|---|
| CACHE LINE 1 | 05 | 13 | 21 | 29 |
| CACHE LINE 2 | (05) | X | X | X |
| CACHE LINE 3 | 02 | 10 | 18 | 26 |
| CACHE LINE 4 | 03 | 11 | 19 | 27 |
| CACHE LINE 5 | 04 | 12 | 20 | 28 |
| CACHE LINE 6 | 25 | 26 | 27 | 28 |

FIG.12

LEVEL 2 CACHE

|  | | | | | | |
|---|---|---|---|---|---|---|
| CACHE LINE 1 | 01 | 02 | 03 | 04 | X | X |
| CACHE LINE 2 | 09 | 10 | 11 | 12 | X | X |
| CACHE LINE 3 | 17 | 18 | 19 | 20 | X | X |
| CACHE LINE 4 | X | X | X | X | X | X |
| CACHE LINE 5 | X | X | X | X | X | X |
| CACHE LINE 6 | X | X | X | X | X | X |
| CACHE LINE 7 | X | X | X | X | X | X |
| CACHE LINE 8 | X | X | X | X | X | X |

FIG. 13A

LEVEL 1 CACHE

| | | | | |
|---|---|---|---|---|
| CACHE LINE 1 | 05 | 13 | 21 | 29 |
| CACHE LINE 2 | 05 | X | X | X |
| CACHE LINE 3 | (06) | 14 | 22 | 30 |
| CACHE LINE 4 | 03 | 11 | 19 | 27 |
| CACHE LINE 5 | 04 | 12 | 20 | 28 |
| CACHE LINE 6 | 25 | 26 | 27 | 28 |

FIG. 13B

LEVEL 1 CACHE

| | | | | |
|---|---|---|---|---|
| CACHE LINE 1 | 05 | 13 | 21 | 29 |
| CACHE LINE 2 | 05 | (06) | X | X |
| CACHE LINE 3 | 06 | 14 | 22 | 30 |
| CACHE LINE 4 | 03 | 11 | 19 | 27 |
| CACHE LINE 5 | 04 | 12 | 20 | 28 |
| CACHE LINE 6 | 25 | 26 | 27 | 28 |

FIG. 13C

LEVEL 1 CACHE

| | | | | |
|---|---|---|---|---|
| CACHE LINE 1 | 05 | 13 | 21 | 29 |
| CACHE LINE 2 | 05 | 06 | X | X |
| CACHE LINE 3 | 06 | 14 | 22 | 30 |
| CACHE LINE 4 | (07) | 15 | 23 | 31 |
| CACHE LINE 5 | 04 | 12 | 20 | 28 |
| CACHE LINE 6 | 25 | 26 | 27 | 28 |

FIG. 13D

LEVEL 1 CACHE

| | | | | |
|---|---|---|---|---|
| CACHE LINE 1 | 05 | 13 | 21 | 29 |
| CACHE LINE 2 | 05 | 06 | (07) | X |
| CACHE LINE 3 | 06 | 14 | 22 | 30 |
| CACHE LINE 4 | 07 | 15 | 23 | 31 |
| CACHE LINE 5 | 04 | 12 | 20 | 28 |
| CACHE LINE 6 | 25 | 26 | 27 | 28 |

FIG. 13E

LEVEL 1 CACHE

| | | | | |
|---|---|---|---|---|
| CACHE LINE 1 | 05 | 13 | 21 | 29 |
| CACHE LINE 2 | 05 | 06 | 07 | X |
| CACHE LINE 3 | 06 | 14 | 22 | 30 |
| CACHE LINE 4 | 07 | 15 | 23 | 31 |
| CACHE LINE 5 | (08) | 16 | 24 | 32 |
| CACHE LINE 6 | 25 | 26 | 27 | 28 |

FIG. 13F

LEVEL 1 CACHE

| | | | | |
|---|---|---|---|---|
| CACHE LINE 1 | 05 | 13 | 21 | 29 |
| CACHE LINE 2 | 05 | 06 | 07 | (08) |
| CACHE LINE 3 | 06 | 14 | 22 | 30 |
| CACHE LINE 4 | 07 | 15 | 23 | 31 |
| CACHE LINE 5 | 08 | 16 | 24 | 32 |
| CACHE LINE 6 | 25 | 26 | 27 | 28 |

FIG. 13G

LEVEL 1 CACHE

| | | | | |
|---|---|---|---|---|
| CACHE LINE 1 | 05 | (13) | 21 | 29 |
| CACHE LINE 2 | 05 | 06 | 07 | 08 |
| CACHE LINE 3 | 06 | 14 | 22 | 30 |
| CACHE LINE 4 | 07 | 15 | 23 | 31 |
| CACHE LINE 5 | 08 | 16 | 24 | 32 |
| CACHE LINE 6 | 25 | 26 | 27 | 28 |

FIG. 13H

LEVEL 1 CACHE

| | | | | |
|---|---|---|---|---|
| CACHE LINE 1 | 05 | 13 | 21 | 29 |
| CACHE LINE 2 | 05 | 06 | 07 | 08 |
| CACHE LINE 3 | 06 | 14 | 22 | 30 |
| CACHE LINE 4 | 07 | 15 | 23 | 31 |
| CACHE LINE 5 | 08 | 16 | 24 | 32 |
| CACHE LINE 6 | (13) | X | X | X |

FIG. 14

LEVEL 2 CACHE

|              | | | | | | |
|---|---|---|---|---|---|---|
| CACHE LINE 1 | 01 | 02 | 03 | 04 | X | X |
| CACHE LINE 2 | 09 | 10 | 11 | 12 | X | X |
| CACHE LINE 3 | 17 | 18 | 19 | 20 | X | X |
| CACHE LINE 4 | 25 | 26 | 27 | 28 | X | X |
| CACHE LINE 5 | X | X | X | X | X | X |
| CACHE LINE 6 | X | X | X | X | X | X |
| CACHE LINE 7 | X | X | X | X | X | X |
| CACHE LINE 8 | X | X | X | X | X | X |

METHOD OF PROCESSING IMAGE DATA TO REORIENT AN IMAGE REPRESENTED BY THE IMAGE DATA IN AN IMAGE-BASED ITEM PROCESSING SYSTEM AND AN APPARATUS THEREFOR

BACKGROUND OF THE INVENTION

The present invention relates to processing documents in an image-based document processing system, and is particularly directed to method of processing image data to reorient a document image represented by the image data in an image-based document processing system, such as an image-based check processing system, and an apparatus therefor.

A typical image-based check processing system includes a number of different types of workstations. The different types of workstations may include a document preparation workstation, an image capture workstation, a recognition workstation, a keying and balancing workstation, and an encoding workstation. Items such as bank checks are initially prepared at the document preparation workstation (e.g., removing staples, paper clips, and the like) for further processing at workstations downstream from the document preparation workstation. Each prepared item is fed along a document feed path of the image capture workstation which captures front and rear images of the item. The image capture workstation creates units of work and submits the created work to a workflow manager in a known way.

Workstations downstream from the image capture workstation poll the workflow manager in a known manner for work to perform, and may also create units of work which are submitted back to the workflow manager. The different workstations downstream from the image capture workstation process the front and rear images of each item. More specifically, the front and rear images of each item are sent to the recognition workstation which provides recognition results associated with the item. Operation of each workstation downstream from the recognition workstation, such as the keying and balancing workstation, and the encoding workstation, depends upon the recognition results provided by the recognition workstation.

When an image of an item is sent to the recognition workstation, the image is sometimes not oriented in a correct orientation for viewing by a human operator. This occurs because hardware associated with the image capture workstation does not scan the item in a right-side up orientation. When an image of an item is not oriented in a correct orientation, grayscale image data which is representative of the document image cannot be binarized and compressed for subsequent storage in an image archive. Eventually the misoriented image of the item needs to be oriented, either manually or automatically by a processor, before the grayscale image data which is representative of the image of the item can be binarized and compressed.

A typical misoriented image of an item needs to be rotated 90 degrees, 180 degrees, or 270 degrees to proper orientation for viewing by the human operator. To rotate the misoriented image of the item to proper orientation for viewing by the human operator, the grayscale image data which represents the image of the item needs to be processed and reoriented. The amount of grayscale image data representative of the misoriented image of the item is usually quite large. For example, a front image of a typical check is represented by about 1200×600 pixels of grayscale data. With such a large amount of grayscale image data to process, the rotation of the front image of the check may take a relatively long time. It would be desirable to process the grayscale image data in a manner which quickly reorients the image of the check to proper orientation for viewing by the human operator.

SUMMARY OF THE INVENTION

In accordance with one aspect of the present invention, a method of processing image data elements derived from lifting an image of an item to reorient the image data elements comprises the steps of (a) selecting a first portion of the image data elements, (b) reorienting the first portion of the image data elements selected in step (a), (c) selecting a second portion of image data elements after the first portion of the image data elements has been reoriented in step (b), and (d) reorienting the second portion of the image data elements selected in step (c). The method may further comprise the steps of (e) selecting a third portion of image data elements after the second portion of the image data elements has been reoriented in step (d), and (f) reorienting the third portion of the image data elements selected in step (e). Preferably, each of the selected first and second portions of image data elements is copied only once into level one cache memory. The selected third portion of image data elements is copied only once into level one cache memory.

In accordance with another aspect of the present invention, an apparatus is provided for processing image data elements derived from lifting an image of an item to reorient the image data elements. The apparatus comprises means for selecting a first portion of the image data elements, means for reorienting the first portion of the image data elements selected, means for selecting a second portion of image data elements after the first portion of the image data elements has been reoriented, and means for reorienting the second portion of the image data elements selected. The apparatus may further comprise means for selecting a third portion of image data elements after the second portion of the image data elements has been reoriented, and means for reorienting the third portion of the image data elements selected. Preferably, each of the selected first and second portions of image data elements is copied only once into level one cache memory. The selected third portion of image data elements is copied only once into level one cache memory.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 6 is a diagrammatic view showing groups of bytes of image data which represents an image of the check of FIG. 3; and FIGS. 7–14 are diagrammatic views showing contents of either level one cache memory or level two cache memory during processing of the groups of bytes of image data shown in FIG. 6.

DETAILS OF THE INVENTION

Figure 1:
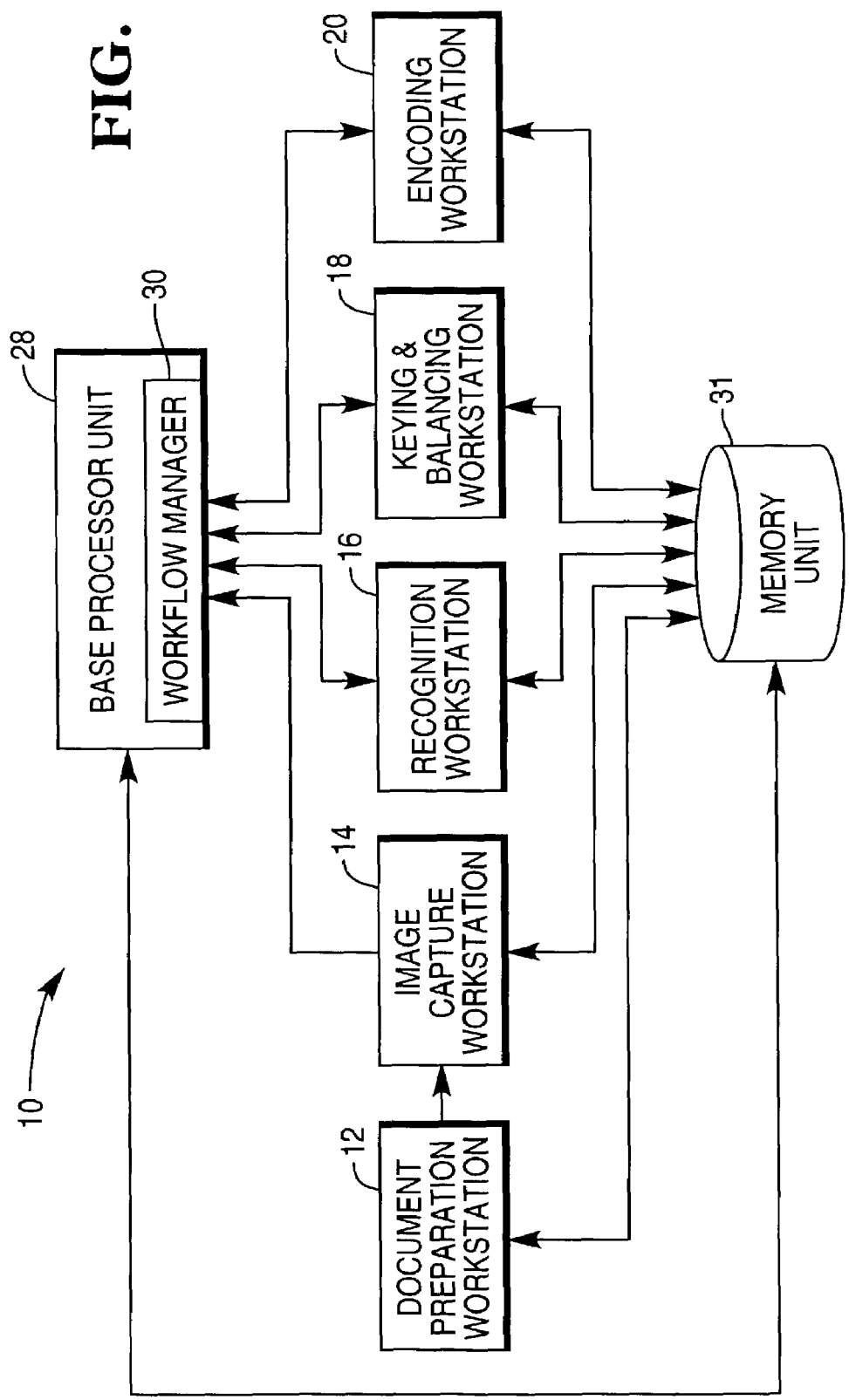
FIG. 1 is a schematic block representation of an image-based check processing system embodying the present invention.

The present invention is directed to a method of processing image data to reorient a document image represented by the image data in an image-based document processing system and an apparatus therefor. The document being processed may be of any type of document. By way of example, a document in the form of a bank check is processed in accordance with the present invention. Also, the specific use of the method and apparatus described in the present application may vary. By way of example, an image-based document processing system in the form of an image-based check processing system 10 embodying the present invention is illustrated in FIG. 1.

The image-based check processing system 10 comprises different types of workstations including a document preparation workstation 12, an image capture workstation 14, a recognition workstation 16, a keying and balancing workstation 18, and an encoding workstation 20. At the document preparation workstation 12, transaction items including a number of debit items and a number of credit items associated with each transaction are prepared for further processing downstream from the document preparation workstation 12. Typical transaction items include checks, deposit slips, and carrier documents (i.e., envelopes) which carry damaged checks. Preparation of the transaction items may include removal of paper clips, staples, and the like, and stacking of the items in a particular order and/or direction in suitable trays. The trays containing the stacked items are then manually carted to the image capture workstation 14.

The image capture workstation 14 creates units of work and submits the created work to a workflow manager 30 in a known way. As shown in FIG. 1, the workflow manager 30 resides in non-volatile memory in a base processor unit 28 of the image-based check processing system 10. Each of the workstations 16, 18, 20, 22 polls the workflow manager 30 in a known manner for work to perform, and may also create units of work which is submitted back to the workflow manager 30.

Figure 2:
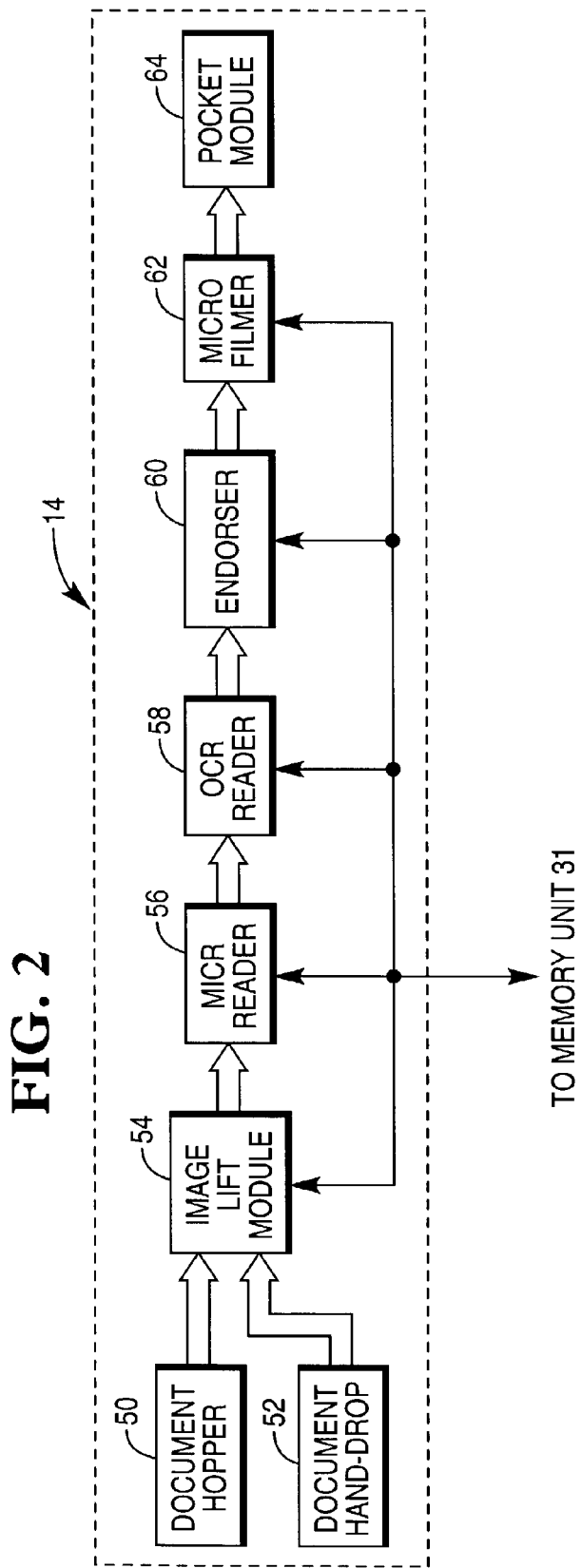
FIG. 2 is a schematic block representation of an image capture workstation in the image-based check processing system of FIG. 1.

Referring to FIG. 2, the image capture workstation 14 includes a document hopper 50 into which stacked items from the trays can be placed so that the items can be transported along a document feed path of the image capture workstation 14. The image capture workstation 14 also includes a document hand-drop 52 into which single items can be manually placed by a human operator so that the item can be merged into and then transported along the document feed path. The image capture workstation 14 further includes a number of different devices which lie along the document feed path. As shown in FIG. 2, the image capture workstation 14 includes an image lift module 54, a MICR reader 56, an OCR reader 58, an endorser 60, and a microfilmer 62, all of which lie along the document feed path. A pocket module 64 is disposed at the end of the document feed path. The pocket module 64 has a number of sorter pockets (not shown) for receiving and pocketing items which have been processed along the document feed path by the different devices along the document feed path.

During operation of the image capture workstation 14, the stacked items in the trays are manually removed from the trays and placed into the document hopper 50. A transport mechanism (not shown) picks items one-by-one from the document hopper 50 and transports the picked items along the document feed path of the image capture workstation 14 in a known manner. Each device lying along the document feed path processes each item transported along the document feed path in a manner described hereinbelow.

Figure 3:
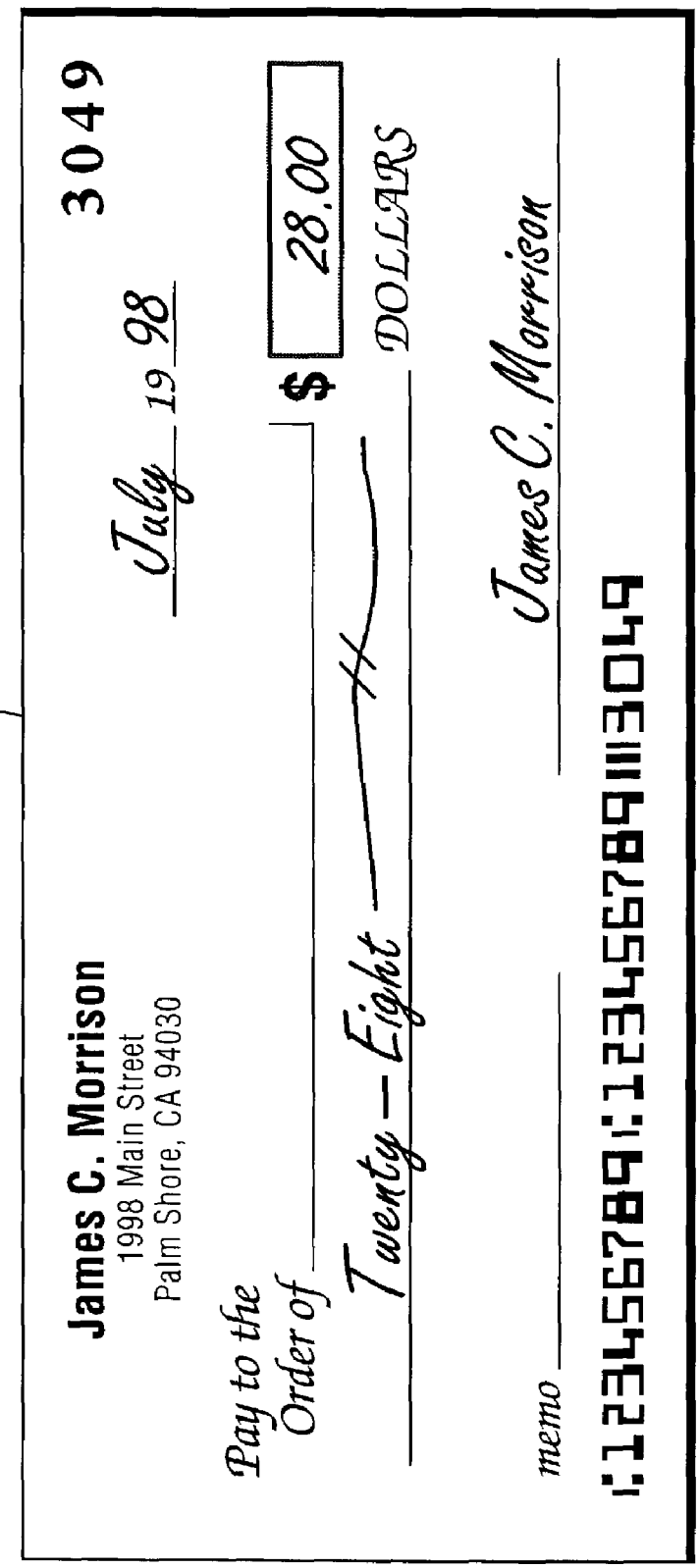
FIG. 3 is a front view of a check having a codeline thereon.

When an item such as a bank check 70 shown in FIG. 3, a front image lift camera (not shown) of the image lift module 54 lifts an image of the front side of the check. More specifically, the image lift camera optically scans the front side of the check 70 as the check moves along the document feed path past the image lift camera to produce a front electronic image of the check. The front image of the check 70 is stored in a memory unit 31. Other items (deposit slips or control documents including batch headers, for example) are processed in the same manner. It is contemplated that a rear image lift camera may also be used to lift an image of the rear of the check 70. However, for simplicity, it is assumed that only an image of the front side of the check 70 is lifted and processed, as described hereinbelow.

If the item moving downstream along the document feed path is in the form of an envelope which contains a damaged check, for example, the MICR reader 56 is unable to read a MICR codeline. The envelope containing the damaged check continues moving downstream along the document feed path. As the envelope continues to move further downstream along the document feed path, the OCR reader 58 attempts to read a codeline of the damaged check contained in the envelope. The OCR reader 58 is controlled via hardware and/or firmware associated with the OCR reader to read the codeline from the damaged check contained in the envelope.

If the item moving downstream along the document feed path is a check such as the check shown in FIG. 3, the MICR reader 56 reads a MICR codeline at the bottom of the check as the check passes by the MICR reader 56. Information from the MICR codeline of the check 70 including a unique sequence number is associated with the front image of the check and is also stored in the memory unit 31. Accordingly, the front image of the check 70 is stored in the memory unit 31 along with a unique sequence number.

The endorser 60 prints a suitable endorsement onto the check 70 as the check continues to move further downstream along the document feed path past the endorser 60. An endorsement status associated with the check 70 is then stored in the memory unit 31 along with the other information associated with the check. Also, the microfilmer 62 microfilms the check 70 as the check continues to move along the document feed path past the microfilmer 62. A microfilm status associated with the check 70 is then stored in the memory unit 31 along with the other information associated with the check.

After the front image of the check 70 is lifted by the image lift camera and the electronic image, the sequence number, and the MICR codeline are stored in the memory unit 31, and the check is endorsed and microfilmed, the check is sorted into an appropriate sorter pocket of the pocket module 64. Preferably, the image capture workstation 14 includes the Model 7780 Item Processing System, manufactured by NCR Corporation, located in Dayton, Ohio. The sorted checks in each of the sorter pockets are stacked in a respective tray. The trays containing the stacked checks are then manually carted to the encoding workstation 20 (FIG. 1).

During operation of the encoding workstation 20, the stacked checks in the trays are manually removed from the trays and placed into a document hopper (not shown) similar to the document hopper 50 of the image capture workstation 14 shown in FIG. 2. Each check is encoded in a known manner. Preferably, the image capture workstation 14 also includes the Model 7780 Item Processing System, manufactured by NCR Corporation, located in Dayton, Ohio. An encoder status associated with each check is also stored in the memory unit 31 along with the other information associated with the check.

The front electronic image, the sequence number, and the MICR codeline of the check 70 which were earlier obtained and stored in the memory unit 31 at the image capture workstation 14 is processed by the recognition workstation 16 and the keying and balancing workstation 18 in the manner described hereinbelow. At the recognition workstation 16, the front electronic image of each check stored in the memory unit 31 is processed using known recognition techniques to determine the "amount" associated with the check. The amount of the check is then associated with the corresponding front electronic image and the MICR codeline of the check and stored in the memory unit 31.

A one-to-one correspondence is thereby established between the front electronic image, the sequence number, the MICR codeline, the endorsement status, the encoder status, and the microfilm status of the check and the amount associated with that particular check. Accordingly, a database containing the front electronic image, the sequence number, the MICR codeline, the endorsement status, the encoder status, the microfilm status, and the amount associated with each check is thereby created and stored in the memory unit 31.

From time to time, it is possible that a check may be incorrectly oriented along the document feed path. When this occurs, the front image of the check 70 would be incorrectly oriented. For examples, the front image of the check 70 may be turned clockwise onto its rightside or turned counterclockwise onto its leftside (i.e., turned 90 degrees or 270 degrees in the clockwise direction along its lengthwise dimension).

When the front image of the check 70 is turned either 90 degrees or 270 degrees along its lengthwise dimension, a method in accordance with the present invention is provided to process image data which is representative of the front image of the check so as to correct the orientation of the front image of the check without having to physically locate the check in one of the sorter pockets of the pocket module 64 and then reprocess the check by feeding it back through the image capture workstation 14. More specifically, after the image lift module 54 captures the front image of a check, an executable image data reorienting program for reorienting the image data which is representative of the front image of the check in accordance with the present invention is executed.

Figure 4A:
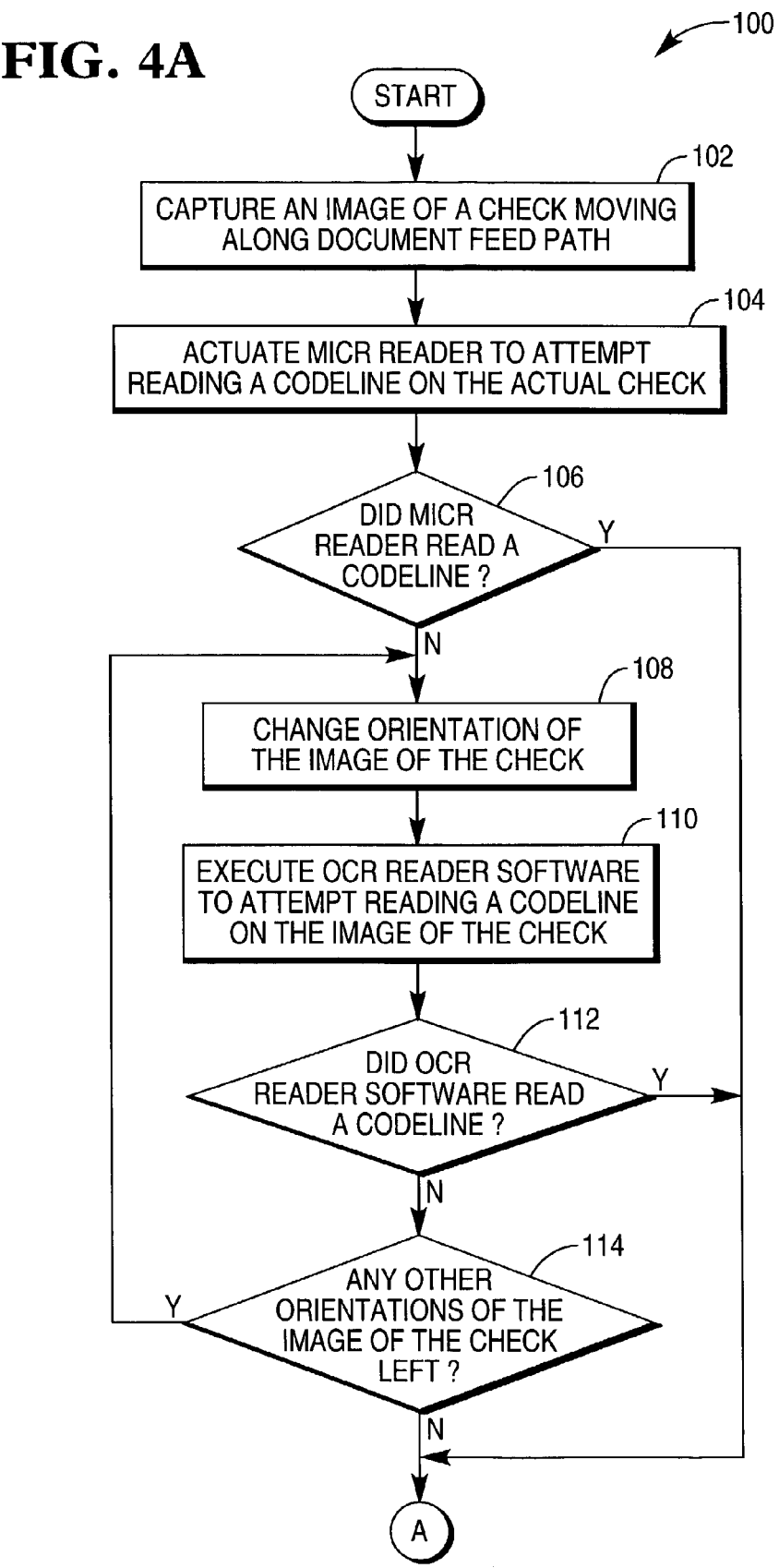
FIG. 4 is a flowchart depicting program steps of an executable image handling program carried out by the image-based check processing system of FIG. 1 to process the check of FIG. 3.
Figure 4B:
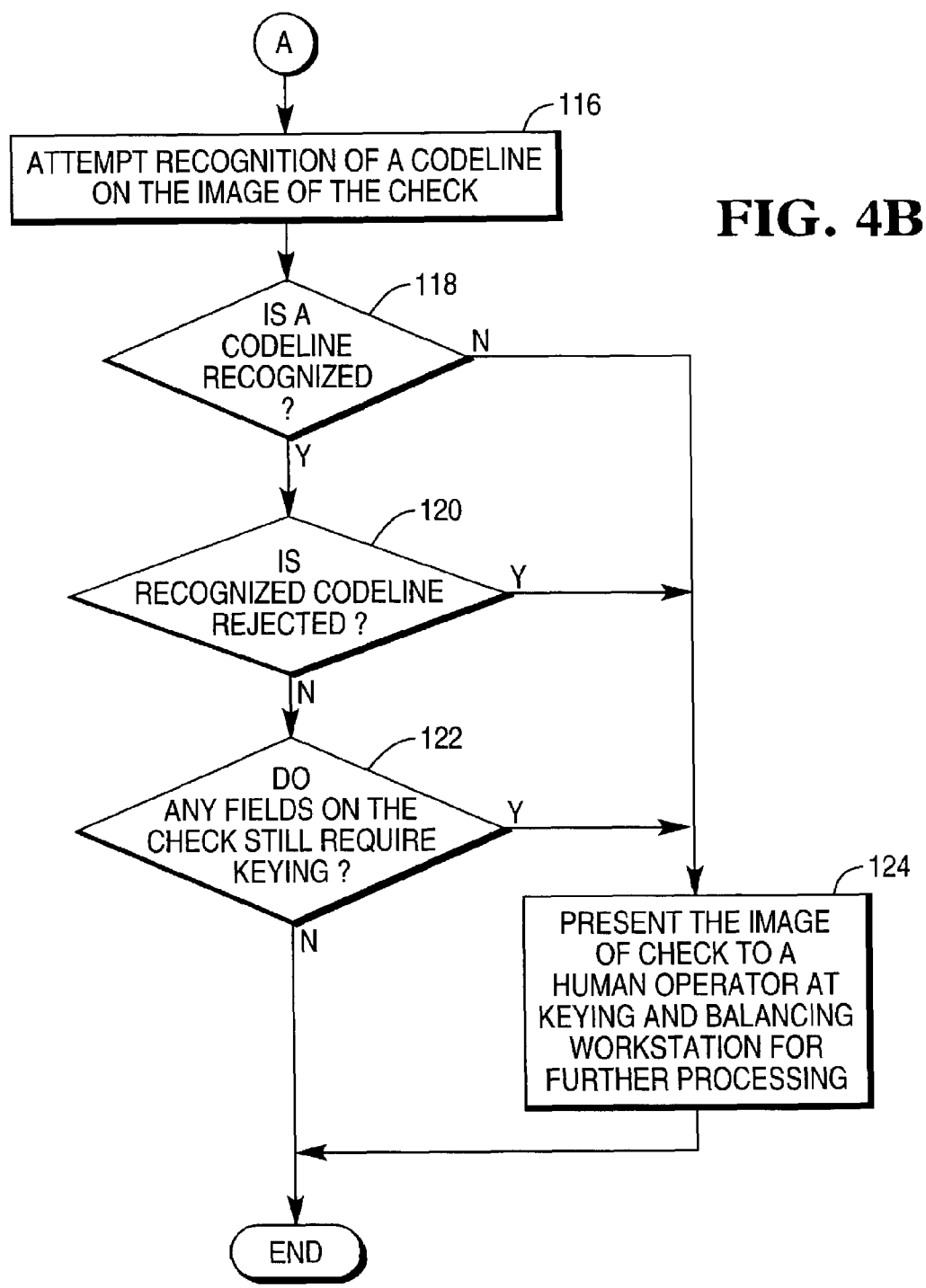

Referring to FIG. 4, a flowchart 100 depicts steps of an image handling program which is initiated immediately after the image lift module 54 captures the front image of a check such as the check 70 of FIG. 3. In step 102, a front image of the check is captured by the image lift module 54. The MICR reader 56 is then actuated in step 104 to make an attempt to read a MICR codeline from the bottom of the check. The program proceeds to step 106 in which a determination is made as to whether or not the MICR reader 56 successfully read a MICR codeline from the bottom of the check.

If the determination in step 106 is affirmative, then the program proceeds to step 116 in which the recognition workstation 16 makes an attempt to recognize the codeline of the check based upon the front image data which was captured in step 102. However, if the determination in step 106 is negative, then the program proceeds to step 108 in which the front image of the check is reoriented to correct orientation. More specifically, the front image of the check is "flipped" 180 degrees along its lengthwise dimension.

After the front image of the check has been flipped, software associated with the OCR reader 58 is executed, as shown in step 110. When software associated with the OCR reader 58 is executed, an attempt is made to read a codeline from the front image data which was captured in step 102. The program then proceeds to step 112 in which a determination is made as to whether the software associated with the OCR reader 58 successfully read a codeline based upon the front image data which was captured in step 102.

If the determination in step 112 is affirmative, then the program proceeds to step 116 in which the recognition workstation 16 makes an attempt to recognize the codeline of the check based upon the front image data which was captured in step 102. If the determination in step 112 is negative, then the program proceeds to step 114 in which a determination is made as to whether any other orientations of the front image of the check remain which have not yet been tried. If the determination in step 114 is affirmative, then the program returns back to step 108 to again change orientation of the front image of the check. However, if the determination in step 114 is negative, then the program proceeds to step 116 in which the recognition workstation 16 makes an attempt to recognize the codeline of the check based upon the front image data which was captured in step 102.

After the recognition workstation 16 makes an attempt to recognize the amount of the check in step 116, the program proceeds to step 118 in which a determination is made as to whether a codeline has been successfully recognized. If the determination in step 118 is negative, then the program proceeds to step 124 in which the front image of the check is presented on a display screen of an image display terminal (not shown) at the keying and balancing workstation 18 in a known manner to allow a human operator to further process the front image of the check manually. For example, the human operator may press either a "ROTATE 90 DEGREES" key or a "ROTATE 270 DEGREES" key (both in the clockwise directions) on a keyboard at the keying and balancing workstation 18 to reorient the front image of the check appearing on the display screen so that it is displayed in correct orientation on the display screen for the human operator to view. The human operator may also then key in the codeline of the check in a known manner.

However, if the determination in step 118 is affirmative, then the program proceeds to step 120 in which a determination is made as to whether the codeline recognized in step 116 is being rejected. If the determination in step 120 is affirmative, then the program proceeds directly to step 124 to present the front image of the check on the display screen of the image display terminal at the keying and balancing workstation 18. If the determination in step 120 is negative, the program proceeds to step 122.

In step 122, a determination is made as to whether there are any other fields on the check which still require keying in of information. If the determination in step 122 is negative, then the program proceeds directly to END. If the determination in step 122 is affirmative, the program proceeds to step 124 to present the front image of the check on the display screen of the image display terminal at the keying and balancing workstation 18 before proceeding to END.

Figure 5:
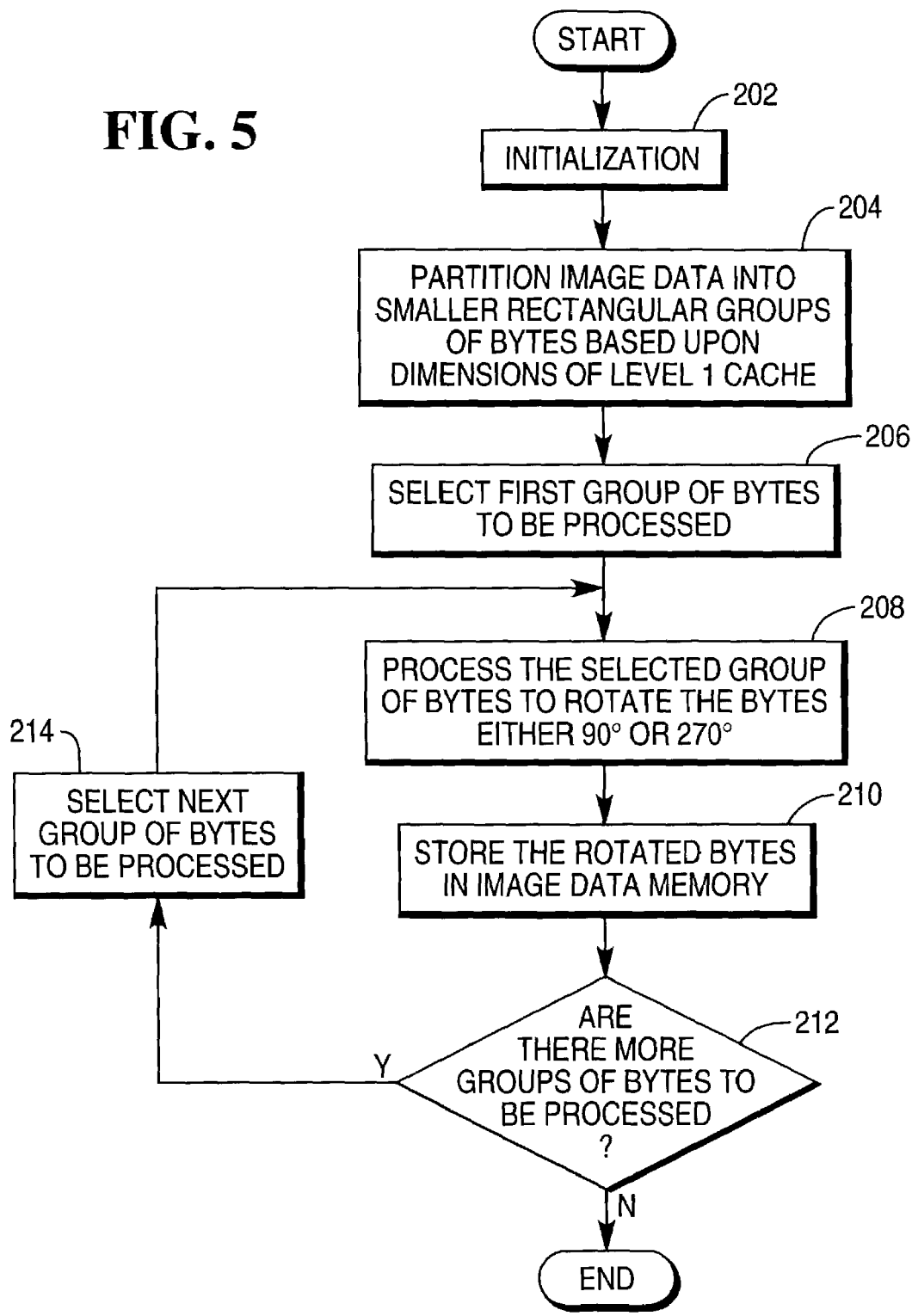
FIG. 5 is a flowchart depicting program steps of an executable image data reorienting program in accordance with the present invention.

Referring to FIG. 5, a flowchart 200 depicts steps of the image data reorienting program which is executed preferably when the operator presses either the "ROTATE 90 DEGREES" key or the "ROTATE 270 DEGREES" key as described hereinabove. After program initialization in step 202, image data which represents the front image of the check is partitioned into smaller rectangular groups of bytes. The actual size of the smaller rectangular groups of bytes will depend upon the actual size of level one cache memory which is used during program execution. It will be assumed that the image data which represents the front image of the check is partitioned into only four smaller rectangular groups of bytes as shown in FIG. 6, and that the size of the level one cache memory used is six cache lines with each cache line being four bytes wide as shown in FIG. 7A. In actual practice, there would be many more than just four smaller rectangular groups of bytes, and a level one cache memory size much greater than just six cache lines in which each cache line is four bytes wide. However, for simplicity and purposes of explanation, the above assumptions will be made in the description to follow.

The program then proceeds to step 206 in which a first group of bytes of image data which represents a portion of the front image of the check is selected for further processing. More specifically, as shown in FIG. 6, a Group I of bytes of image data is selected for further processing. Then, in step 208, the bytes contained within Group I are processed to rotate the bytes either 90 degrees clockwise or 270 degrees clockwise. For purposes of explanation, it will be assumed that the bytes contained within Group I are to be rotated 90 degrees in the clockwise direction. After the bytes contained within Group I are rotated 90 degrees, then these rotated bytes are stored in image data memory for subsequent retrieval to display a rotated image of the check, for example.

After the bytes contained within Group I are rotated 90 degrees and stored in image data memory, the program proceeds to step 212 in which a determination is made as to whether there are any more groups of bytes of image data to be processed. If the determination in step 212 is affirmative, then the program proceeds to step 214 in which the next group of bytes of image data which represents another portion of the front image of the check is selected for further processing. The program returns to step 208 to process the newly selected group of bytes of image data in the same manner that the bytes contained within Group I were processed, as described hereinabove. In the example shown in FIG. 6, there are three more groups of bytes (Group II, Group III, and Group IV) to be processed. After all groups of bytes have been processed, the determination in step 212 becomes negative and the program ends.

The description hereinbelow describes in detail the process by which the bytes contained within Group I shown in FIG. 6 are rotated 90 degrees in the clockwise direction. As shown in FIG. 6, the bytes contained within Group I are partitioned further into a first subgroup 301 of bytes and a second subgroup 302 of bytes. More specifically, the rotation of the bytes contained within the first subgroup 301 of bytes is described in detail below.

First, byte 01 of the first subgroup 301 shown in FIG. 6 is read. When byte 01 of the first subgroup 301 is read, the entire horizontal row of bytes (i.e., bytes 01, 09, 17, and 25) is copied into cache line 1 of level one cache memory as shown in FIG. 7A. The byte 01 of the first subgroup 301 is then written. When byte 01 of the first subgroup 301 is written, only byte 01 is copied into cache line 2 of the level one cache memory as shown in FIG. 7B. Then, byte 02 of the first subgroup 301 shown in FIG. 6 is read. When byte 02 of the first subgroup 301 is read, the entire horizontal row of bytes (i.e., bytes 02, 10, 18, and 26) is copied into cache line 3 of level one cache memory as shown in FIG. 7C. The byte 02 of the first subgroup 301 is then written. When byte 02 of the first subgroup 301 is written, only byte 02 is copied into cache line 2 of the level one cache memory as shown in FIG. 7D. Bytes 03 and 04 of the first subgroup 301 are processed in the same manner as byte 02, as illustrated in FIGS. 7E, 7F, 7G, and 7H.

The program continues, as shown in FIGS. 7I and 7J, in which byte 09 is read and written. When byte 09 is written, byte 09 is written into cache line 6 of level one cache memory as shown in FIG. 7J. Byte 10 is then read and written, as shown in FIGS. 7K and 7L. When byte 10 is written, byte is written into cache line 6 of level one cache memory as shown in FIG. 7L. Bytes 11 and 12 of the first subgroup 301 are processed in the same manner as byte 10, as illustrated in FIGS. 7M, 7N, 7O, and 7P.

Next, as shown in FIGS. 7Q and 7R, byte 17 is read and written. When byte 17 is written, byte 17 overwrites the content contained in cache line 2 of level one cache memory as shown in FIG. 7R. The content contained in cache line 2 of level one cache memory is overwritten because this content is the least recently used. When the content of cache line 2 is overwritten with byte 17, as shown in FIG. 7R, the content is copied into a cache line of level two cache memory as shown in FIG. 8. In FIG. 8, the content of what was contained in cache line 2 of level one cache memory is copied into cache line 1 of level two cache memory. The technique of overwriting content of a cache line in level one cache memory based upon the least recently used cache line and the technique of copying the overwritten content into a cache line in level two cache memory are well known and, therefore, will not be described.

The program continues, as shown in FIGS. 9A and 9B, in which byte 18 is read and written. When byte 18 is written, only byte 18 is copied into cache line 2 of the level one cache memory as shown in FIG. 9B. Bytes 19 and 20 of the first subgroup 301 are processed in the same manner as byte 18, as illustrated in FIGS. 9C, 9D, 9E, and 9F. Next, as shown in FIGS. 9G and 9H, byte 25 is read and written. When this occurs, byte 25 overwrites the content contained in cache line 6 of level one cache memory as shown in FIG. 9H. The content contained in cache line 6 of level one cache memory is overwritten because this content is the least recently used. When the content of cache line 6 is overwritten with byte 25, as shown in FIG. 9H, the content is copied into a cache line of level two cache memory as shown in FIG. 10. In FIG. 10, the content of what was contained in cache line 6 of level one cache memory is copied into cache line 2 of level two cache memory.

The program continues, as shown in FIGS. 11A and 11B, in which byte 26 is read and written. When byte 26 is written, only byte 26 is copied into cache line 6 of level one cache memory as shown in FIG. 11B. Bytes 27 and 28 of the first subgroup 301 are processed in the same manner as bye 26, as illustrated in FIGS. 11C, 11D, 11E, and 11F. Next, as shown in FIGS. 11G and 11H, byte 05 of the second subgroup 302 of bytes (FIG. 6) is read and written. At this point, all of the bytes of the first subgroup 301 have been processed and the first byte (i.e., byte 05) of the second subgroup 302 is being processed.

When byte 05 is written, byte 05 overwrites the content contained in cache line 2 of the level one cache memory as shown in FIG. 11H. The content contained in cache line 2 of level one cache memory is overwritten because this content is the least recently used. When the content of cache line 2 is overwritten with byte 05, as shown in FIG. 11H, the content is copied into a cache line of level two cache memory as shown in FIG. 12. In FIG. 12, the content of what was contained in cache line 2 of level one cache memory is copied into cache line 3 of level two cache memory.

Then, as shown in FIGS. 13A and 13B, byte 06 is read and written. When byte 06 is written, byte 06 is written into cache line 2 of level one cache memory as shown in FIG. 13B. Bytes 07 and 08 of the first subgroup 301 are processed in the same manner as byte 06, as illustrated in FIGS. 13C, 13D, 13E, and 13F. As shown in FIGS. 13G and 13H, byte 13 is read and written. When byte 13 is written, byte 13 overwrites the content contained in cache line 6 of level one cache memory as shown in FIG. 13H. The content contained in cache line 6 of level one cache memory is overwritten because this content is the least recently used. When the content of cache line 6 is overwritten with byte 13, as shown in FIG. 13H, the content is copied into a cache line of level two cache memory as shown in FIG. 14. In FIG. 14, the content of what was contained in cache line 6 of level one cache memory is copied into cache line 4 of level two cache memory.

It should be apparent that the bytes of image data contained in level two cache memory, as shown in FIG. 14, is the same as the bytes of image data contained in the first subgroup 301, as shown in FIG. 6, except that the bytes of image data shown in FIG. 14 is rotated 90 degrees clockwise. The bytes of image data contained in the level two cache memory as shown in FIG. 14 is stored in an image data memory for later retrieval. The second subgroup 302 of bytes, as shown in FIG. 6, is then processed in the same manner as described hereinabove for the first subgroup 301 of bytes. Also, as shown in FIG. 6, the other three groups of bytes (i.e., Group II, Group, and Group IV) are processed in the same manner as described hereinabove for Group I. After all groups of bytes have been processed in the manner described hereinabove, the result is image data which is representative of an image of the front of check rotated 90 degrees in the clockwise direction relative to the original image of the front of the check.

A number of advantages result by processing image data in accordance with the present invention to reorient an image represented by the image data by either 90 degrees or 270 degrees. One advantage is that optimal use is made of level one cache memory to rotate image data by either 90 degrees or 270 degrees. Another advantage is that of checks are reoriented typically between two to three times faster than the known processing method of performing a straight forward scan line by scan line copy. The result is savings in time and increased throughput of checks.

Although the above description describes images of checks being reoriented in a check processing application, it is contemplated that images of items other than checks be reoriented in other types of applications.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of processing image data in a first arrangement which is representative of an image of an item in a first orientation to provide image data in a second arrangement which is representative of an image of the item in a second orientation which is rotated transversely relative to the first orientation, the method comprising:
    partitioning the image data in the first arrangement into a plurality of rectangular groups of bytes of image data based upon size of a level one cache memory which is used for processing image data; and
    processing the bytes of image data in each of the plurality of rectangular groups of bytes such that each byte of image data is required to be copied once and only once into the level one cache memory during processing of the image data in the first arrangement to provide the image data in the second arrangement.

2. A method according to claim 1, wherein the second orientation is rotated ninety degrees relative to the first orientation.

3. A method of processing image data in a first arrangement which is representative of an image of an item in a first orientation to provide image data in a second arrangement which is representative of an image of the item in a second orientation which is rotated transversely relative to the first orientation, the method comprising:
    partitioning the image data in the first arrangement into a first plurality of groups of bytes of image data;
    partitioning each of the first plurality of groups of bytes of image data into a second plurality of groups of bytes based upon size of a level one cache memory which is used for processing image data; and
    processing the bytes of image data in each of the second plurality of groups of bytes such that each byte of image data is required to be copied once into the level one cache memory during processing of the image data in the first arrangement to provide the image data in the second arrangement, wherein (i) each of the first plurality of groups of bytes of image data comprises a rectangular group of bytes of image data, (ii) each of the second plurality of group of bytes of image data comprises a rectangular group of bytes of image data, and (iii) the size of each rectangular group of bytes from the second plurality of groups of bytes is smaller than the size of each rectangular group of bytes from the first plurality of groups of bytes.

4. A method according to claim 3, wherein the second orientation is rotated ninety degrees relative to the first orientation.

5. An apparatus for processing image data in a first arrangement which is representative of an image of an item in a first orientation to provide image data in a second arrangement which is representative of an image of the item in a second orientation which is rotated transversely relative to the first orientation, the apparatus comprising:
    a first processor for partitioning the image data in the first arrangement into a first plurality of groups of bytes of image data based upon size of a level one cache memory which is used for processing image data;
    a second processor for partitioning each of the first plurality of groups of bytes of image data into a second plurality of groups of bytes based upon size of a level one cache memory which is used for processing image data; and
    a third processor for processing the bytes of image data in each of the second plurality of groups of bytes such that each byte of image data is required to be copied once into the level one cache memory during processing of the image data in the first arrangement to provide the image data in the second arrangement, wherein (i) each of the first plurality of groups of bytes of image data comprises a rectangular group of bytes of image data, (ii) each of the second plurality of group of bytes of image data comprises a rectangular group of bytes of image data, and (iii) the size of each rectangular group of bytes from the second plurality of groups of bytes is smaller than the size of each rectangular group of bytes from the first plurality of groups of bytes.

6. An apparatus according to claim 5, wherein the first processor, the second processor, and the third processor comprise the same processor.

* * * * *